United States Patent
Deo et al.

(10) Patent No.: US 11,359,132 B2
(45) Date of Patent: Jun. 14, 2022

(54) SCALE INHIBITION USING BRANCHED POLYMERS

(71) Applicants: DOW GLOBAL TECHNOLOGIES LLC, Midland, MI (US); Rohm and Haas Company, Collegeville, PA (US); THE REGENTS OF THE UNIVERSITY OF CALIFORNIA, Oakland, CA (US)

(72) Inventors: Puspendu Deo, Lake Jackson, TX (US); Antony K. Van Dyk, Collegeville, PA (US); Paul Clark, Midland, MI (US); David Lunn, Oxfordshire (GB); Craig Hawker, Santa Barbara, CA (US); Maria Simon, Lake Jackson, TX (US); Sungbaek Seo, Gyeongsangnam-do (KR); Alaina McGrath, Santa Barbara, CA (US)

(73) Assignees: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 17/425,971

(22) PCT Filed: Jan. 28, 2020

(86) PCT No.: PCT/US2020/015392
§ 371 (c)(1),
(2) Date: Jul. 27, 2021

(87) PCT Pub. No.: WO2020/159975
PCT Pub. Date: Aug. 6, 2020

(65) Prior Publication Data
US 2022/0041918 A1    Feb. 10, 2022

Related U.S. Application Data

(60) Provisional application No. 62/797,625, filed on Jan. 28, 2019.

(51) Int. Cl.
C09K 8/528 (2006.01)
C02F 5/10 (2006.01)
(Continued)

(52) U.S. Cl.
CPC ............ C09K 8/528 (2013.01); C02F 5/10 (2013.01); C08F 220/06 (2013.01); C09K 8/588 (2013.01);
(Continued)

(58) Field of Classification Search
USPC ........................................ 210/696–702, 749
See application file for complete search history.

(56) References Cited

U.S. PATENT DOCUMENTS

| 5,032,646 A | 7/1991 | Walinsky |
| 2010/0216960 A1* | 8/2010 | Ahrens ............... C08F 283/00 526/278 |
| 2016/0096908 A1 | 4/2016 | Wang et al. |

FOREIGN PATENT DOCUMENTS

| EP | 0850963 A1 | 7/1998 |
| WO | 2015183675 A1 | 12/2015 |
| WO | 2016134873 A1 | 9/2016 |

OTHER PUBLICATIONS

Antony, A. et al., "Scale formation and control in high pressure membrane water treatment systems: A review", Journal of Membrane Science, vol. 383, 2011; pp. 1-16.
(Continued)

*Primary Examiner* — Clare M Perrin
(74) *Attorney, Agent, or Firm* — Cantor Colburn LLP (57) ABSTRACT

Disclosed herein is a method for inhibiting scale comprising adding to a fluid that causes scale formation a polycarboxylic acid having a polymer backbone and a plurality of branches from the polymer backbone.

16 Claims, 2 Drawing Sheets

(51) Int. Cl.
   *C08F 220/06* (2006.01)
   *C09K 8/588* (2006.01)
   *C02F 1/68* (2006.01)
   *C02F 103/02* (2006.01)

(52) U.S. Cl.
   CPC ........ *C02F 1/683* (2013.01); *C02F 2103/023* (2013.01)

(56) References Cited

OTHER PUBLICATIONS

De Wispelaere, M.: "Early Condensate in a Fossil Power Plant using organic treatment", 14th International Conference on the Properties of Water and Steam in Kyoto, 2004; 4 pages.

Quan, Zhenhua et al., "Experimental study on scale inhibition performance of a green scale inhibitor polyaspartic acid", Science in China Series B: Chemistry, vol. 51, No. 7, Jul. 2008; pp. 695-699.

Ross, R. J. et al., "Polyaspartate Scale Inhibitors—Biodegradable Alternatives to Polyacrylates", The NACE International Annual Conference and Exposition, paper No. 162, 1996; 12 pages.

Schweinsberg, M. et al., "New Stable Biodegradable Scale Inhibitor Formulations for Cooling Water Development and Field Tests", 64th Int. Water Conf., Pittsburgh, 2003; 13 pages.

International Search Report for the corresponding International Application No. PCT/US2020/015392; International Filing Date: Jan. 28, 2020; dated May 13, 2020; 6 pages.

Written Opinion for the corresponding International Application No. PCT/US2020/015392; International Filing Date: Jan. 28, 2020; dated May 13, 2020; 7 pages.

Amjad, Z. et al., "The Science and Technology of Industrial Water Treatment", CRC Press, 2010; 532 pages.

Amjad, Z. et al., "Water Treater Deposit Control Polymer Evaluation Criteria and Considerations", Association of Water Technologies, 2012; 16 pages.

Hasson, D. et al., "State of the Art of Friendly "Green" Scale Control Inhibitors: A Review Article", Industrial & Engineering Chemistry Research, vol. 50, 2011; pp. 7601-7607.

Ma, S. et al., "Preparation of a phosphorous-free terpolymer as a dcalcifying agent for removing calcium from crude oil", RCS Advances, vol. 6, 2016; pp. 58426-58433.

Ma, S. et al., "Synthesis of acrylic acid-allylpolyethoxy amino carboxylate copolymer and its application for removing calcium from crude oil", RCS Advances, vol. 6, 2016; pp. 24786-24791.

Sheikhi, A. et al., "Macromolecule-based platforms for developing tailor-made formulations for scale inhibition", Environmental Science: Water Research and Technology, vol. 2, 2016; pp. 71-84.

\* cited by examiner

SCALE INHIBITION USING BRANCHED POLYMERS

CROSS-REFERENCE TO RELATED APPLICATIONS

This application is a National Stage application of PCT/US2020/015392, filed Jan. 28, 2020, which claims the benefit of U.S. Application No. 62/797,625, filed on Jan. 28, 2019, both of which are incorporated herein by reference in their entirety.

FIELD OF THE INVENTION

The field of this invention is a method for inhibiting scale formation.

BACKGROUND

The accumulation of unwanted deposits (mineral scales, corrosive products, etc.) occurs in the majority of industrial processes where equipment surfaces are in contact with untreated water. These deposit build-ups can cause operational problems, such as blocking of pipes and pumps, increased running costs, and ultimately equipment failure.

For example, in oilfield applications, precipitation of inorganic salts, such as calcium carbonate, calcium sulfate, barium sulfate or strontium sulfate, from aqueous fluids to form scale is a persistent and common problem during operations to recover hydrocarbons from subterranean formations. Water flooding is the most widely used technique to recover oil from oil-bearing subterranean formations. The technique involves injecting water into the formation to drive oil therein toward a production system composed of one or more wells through which the oil is recovered. The injection water may be produced water or seawater. Seawater, which is readily available in offshore operations, is typically used for the injection water in the water flooding operation. Seawater contains large amounts of dissolved salts such as sulfate. Therefore, sulfate scales are formed when seawater is mixed with formation water. The carbonate scales are primarily generated in the near wellbore/wellbore region due to the pressure drop. Carbon dioxide is frequently introduced into the formations during enhanced oil recovery operations, resulting in absorption of carbon dioxide into aqueous fluids. As aqueous fluids enter the wellbore during production, a reduction in pressure causes the absorbed carbon dioxide to flash out of the aqueous fluids to gas phase. This increases the pH of aqueous fluids and causes growth of carbonate scales in the near wellbore/wellbore region. Furthermore, water encountered in oilfield operations contains low solubility salts. Under certain conditions, these sparingly soluble salts may precipitate out of water resulting in scale formation on various surfaces of the oil recovery system such as walls of pipework, heat exchanger surfaces, valves, and vessels. The scale can block the perforations in the casing, production tubing, downhole pumps and the formation in either the production well or injection wells. Additionally, scale can block the near wellbore region matrix permeability and micro fissures. Scale formation affects heat transfer, interferes with fluid flow, facilitates corrosion and harbors bacteria. In oilfield piping and tubing, scale can cause restriction to flow and high friction loss. Furthermore, the oil production rate declines steadily as the scale forms. To restore the oil production rate, various methods have been used.

In other industrial applications, the emphasis placed on water conservation has made it necessary for industrial water systems to operate at higher concentrations and for extended periods, increasing the potential for deposit accumulation. As a result of this, there is still a significant commercial demand for new and improved additives to control scaling, corrosion, and biofouling.

Polymers derived from carboxylic acids (e.g polyacrylic acids) are one class of scale inhibitors that are used in industrial applications, including oilfield applications, where equipment is subject to fouling from scale growth. See e.g. U.S. Pat. No. 5,032,646A disclosing copolymers of methacrylic acid and itaconic acid for scale inhibition.

There remains a desire for new scale inhibitors, particularly those that are effective at lower application levels.

SUMMARY OF THE INVENTION

The present inventors have found that use of a branched structure polycarboxylic acid having a polymeric backbone and a plurality of relatively short chain polymeric branches from that backbone provides remarkably enhanced scale inhibition as compared to linear polymers of the same polycarboxylic acid.

Thus, disclosed herein is a method for inhibiting scale comprising adding to a fluid that causes scale formation an antiscale agent which is selected from a polycarboxylic acid, a salt thereof, an ester thereof, a combination of two of the acid, the salt and the ester, or a combination of the salt, acid and the ester and which is characterized by having a polymer backbone and a plurality of branches from the polymer backbone.

DETAILED DESCRIPTION OF THE INVENTION

The branched polycarboxylic acids used the disclosed method are addition polymers of carboxylic acid-functional ethylenically unsaturated monomers, $R(COOH)_x$, or salts thereof (where instead of H there is a metal ion M), or esters thereof (where instead of H there is a group $R_a$ which is hydrocarbyl group such aryl group of 6-8 carbon atoms or an alkyl group having at least 1, at least 2, or at 3 carbon atoms and up to 8, up to 7, up to 6, up to 5, or up to 4 carbon atoms), where x is 1, 2, or 3, R is an ethylenically unsaturated hydrocarbyl group and/or $R_a$ is an polycarboxylic acid chain having a degree of polymerization of at least 2, at least 3, at least 4, or at least 5 up to 20, up to 18, up to 15, up to 12, or up to 10. R can be an alkenyl group having at least 2 or at least 3 carbon atoms. R can be an alkenyl group having no more than 10, no more than 9, no more than 8, no more than 7, no more than 6, or no more than 5 carbon atoms. The carboxylic acid-functional ethylenically unsaturated monomer or salt or ester thereof can be, for example, acrylic acid, methacrylic acid, butenoic acid, crotonic acid, itaconic acid, an itaconic acid monoester, fumaric acid, a fumaric acid monoester, maleic acid, a maleic acid monoester, or a combination comprising at least one of the foregoing carboxylic acid-functional ethylenically unsaturated monomers. The branched polycarboxylic acid can also be an addition polymer of a carboxylic acid anhydride-functional ethylenically unsaturated monomer, in which the carboxylic acid anhydride functionality can be converted to carboxylic acid functionality, for example itaconic anhydride and maleic anhydride. The carboxylic acid-functional ethylenically unsaturated monomer can be (meth)acrylic acid, i.e. acrylic acid, methacrylic acid, or a combination thereof. The branched polycarboxylic acid or salt thereof of can be derived from polymerization of (meth)acrylic acid, for example it can be a polyacrylic acid (PAA) or a polymethacrylic acid (PMAA).

The backbone of the branched polycarboxylic acid can be PAA or PMA and the branches can be made from other monomers as described above or from difunctional carboxylic acids or there anhydrides, such as itaconic acid or itaconic anhydride. The branches can be derived from ethylenically unsaturated oligomers such as oligocarboxylates.

As used herein a "salt" can be an alkali metal salt, an alkaline earth metal salt, an ammonium salt, or a quaternary ammonium salt. The salt can be, for example, a lithium salt, a potassium salt, or an ammonium salt. The salt can be a sodium salt.

The branched polycarboxylic acid can be a homopolymer. Alternatively, the branched polycarboxylic acid can be a copolymer of carboxylic acid-functional ethylenically unsaturated monomer and other ethylenically unsaturated monomers.

For example, the other ethylenically unsaturated monomer can be a nonionic monomer. The nonionic monomer can be a hydrophilic non-ionic ethylenically unsaturated monomer, for example hydroxyethyl (meth)acrylate, hydroxypropyl (meth)acrylate, polyethylene glycol (meth)acrylate, or (meth)acrylamide. The nonionic monomer can also be a hydrophobic non-ionic monomer, for example an alkyl ester of (meth)acrylic acid, such as methyl (meth)acrylate, ethyl (meth)acrylate, butyl (meth)acrylate, 2-ethylhexyl (meth)acrylate, decyl (meth)acrylate, isodecyl (meth)acrylate, and lauryl (meth)acrylate. The nonionic monomer can also be styrene, or a substituted styrene such as α-methyl styrene, an α-olefin such as ethylene, propylene, 1-decene, and diisobutylene, or butadiene. The nonionic monomer can also be a vinyl monomer such as acrylonitrile, vinyl chloride, vinyl acetate, vinyl butyrate, or a vinyl ester of a branched, tertiary-alkyl alcohol, sold under the tradename VeoVa™, for example VeoVa™ 9 Monomer, VeoVa™ 10 Monomer, VeoVa™ 11 Monomer, available from Momentive Specialty Chemicals. The polycarboxylic acid can be derived from copolymerization of (meth)acrylic acid with at least one other (meth)acrylic or vinyl monomer.

The polycarboxylic acid can have an average degree of polymerization (i.e. number of repeat units) of at least 10, at least 15, or at least 20. The polycarboxylic acid can have a degree of polymerization of no more than 500, no more than 400, no more than 300, no more than 200, no more than 150. no more than 100, or no more than 80. In the alternative, the polycarboxylic acid can have a number-average molecular weight of at least 500, at least 700, at least 1000, at least 1200. or at least 1500 g/mol. The number average molecular weight can be no more than 50,000, no more than 30,000, no more than 20,000, no more than 15,000, no more than 10,000, or no more than 5000 g/mol, as measured by gel permeation chromatography relative to polyethylene oxide (PEO) standards. Polydispersity is a measure of the width of a molecular weight distribution, and is defined as the ratio of weight-average molecular weight to number-average molecular weight. The branched polycarboxylic acid or salt thereof, can have a polydispersity of less than or equal to 2.5.

Within this range, the polydispersity can be less than or equal to 2.0, less than or equal to 1.5, less than or equal to 1.4, less than or equal to 1.3, less than or equal to 1.2, or less than or equal to 1.1.

The backbone of the branched polycarboxylic acid can have a degree of polymerization of at least 6, at least 8, at least 10, at least 12, at least 15, or at least 20. The backbone of the branched carboxylic acid can have a degree of polymerization of no more than 400, no more than 300, no more than 200, no more than 150, no more than 100, no more than 50, no more than 40, or no more than 35. There can be at least 2, at least 3, at least 4, at least 5, at least 7, at least 10, at least 15, or at least 20 branches. There can be no more than 50, no more than 40, no more than 30, no more than 20, or no more than 15 branches. The branches can be attached such that they are not attached to the same or adjacent repeat units in the backbone, or alternatively, at least two branches can be attached to adjacent repeat units in the backbone.

The average degree of polymerization of the branches can be at least 2 or at least 3 or at least 4 or at least 5. The degree of polymerization the branches can be no more than 50, no more than 20, no more than 15, or no more than 10.

For example, the branched polycarboxylic acid may have a degree of polymerization in the range of 20 to 60 with a number of branches in the range of 5 to 15 and a degree of polymerization in the branches of from 2 to 5.

As another example, the polyacrylic acid may be formed from an alkyl acrylate ester such as tert-butyl acrylate ester (TBA) and then hydrolyzed to form the acid structures. However, there may be some residual unhydrolyzed groups, e.g. —COOR$_a$ groups, wherein R$_a$ is as defined above. Therefore, the polycarboxylic acid (or salt) can be characterized in that at least 50, at least 60, at least 70, at least 80, or at least 90% of the —(C=O)O— groups are present in acid and/or salt form.

The polyacrylic acid or salt thereof can be a combination of acid and the salt.

The branched polycarboxylic acid was found by the present inventors to be effective in much smaller amounts than a linear polymer of the same monomers. The branched polycarboxylic acid can be used and has been found effective to treat fluids for sulfate scales such as Barium Sulfate or carbonate scales such as calcium carbonate.

The amount of the branched carboxylic acid added to the fluid to be treated can be less than 200, less than 100, less than 50, less than 40, less than 30, less than 20, or less than 10 parts per million (ppm) based on total weight of the fluid. The amount of branched carboxylic acid added to the fluid can be at least 1, at least 2, at least 3, at least 4, or at least 5 ppm.

The fluid to be treated may be fluids is pipelines, horizontal wells, well walls, waste water or the like. The fluid may be those used in oil and gas production. The scale inhibition composition may be introduced by known means such as capillary injection or squeeze treatment.

EXAMPLES

Dynamic Scale Loop Test

The differential dynamic scale loop (DSL) is a tube blocking system to examine the precipitation and deposition of scale and other salt crystals in pipe work systems like oil or water pipelines. A DSL instrument from PSL Systemtechnik Company is used to evaluate the scale precipitation and deposition under pipeline and reservoir conditions. The apparatus determine the efficiency of chemical inhibitors against inorganic mineral scales formed through the minimum inhibitor concentration (MIC), hence the MIC is necessary to perform comparative purpose for different scale inhibitors. The DSL technique used the tube blocking test as an industry standard to determine the MIC in dynamic reservoir conditions. Inhibitor efficiency can be calculated as the ratio between the times needed to tube blocking in the presence of inhibitor divided by the time needed to tube blocking in absence of inhibitor.

A benefit of dynamic tube blocking experiments compared to static one is the wide range of pressure and temperature in order to simulate real downhole production conditions. Performance of the scale inhibitors in dynamic flowing conditions was evaluated with the help of a dynamic tube blocking apparatus.

The tests can be performed at temperature of 100° C., pressure of 250 psi with calcium, strontium and barium as cations solution and sulfate and bicarbonate as anion solution. The solutions are filtered, preheated through coils and pumped at combined flow rate of 10 mL/min.

In a typical experiment, the scaling blank time is first determined. The blank time is the time required to observe an increase in differential pressure due to scale build up (from 0 to 5 psi differential pressure) without the addition of scale inhibitor. The scale inhibitor performance is then evaluated by repeating the test at different dose rates of scale inhibitor, for each dose rate, the test is allowed to proceed for twice the blank time. A "Pass" for a specific dose rate is given if the increase in differential pressure is not reached 5. The scale inhibitor dose is reduced and the test is continued. The test is stopped when the differential pressure is reached 5 at times shorter than the required time to step down the scale inhibitor dose. The Minimum Inhibitor Concentration (MIC) required to control scale is defined as the lowest dose rate at which the "Pass" criterion was met (i.e.: lowest scale inhibitor concentration that did not allow the differential pressure to reach 5 for a time equal or larger than double the blank time).

Example 1—Synthesis of Branched Polymer

Poly(TBA:diTBA) as shown on the right of the above chemical reaction can be made as follows. Ethyl 2-bromo-2-methylpropanoate (0.062 g, 0.38 mmol), diTBA (1.0 g, 3.2 mmol), TBA (6.7 g, 54 mmol), and PMDETA (0.066 g, 0.38 mmol) were added to a schlenk flask and the mixture was degassed via freeze-pump-thaw 3 times. The mixture was frozen one more time and backfilled with argon. While still frozen, CuBr (0.055 g, 0.38 mmol) was added and the mixture was degassed again via freeze-pump-thaw 2 times. The mixture is then allowed to warm to rt and placed in an oil bath at 70° C.

After 4 hours, the reaction mixture was frozen in liquid nitrogen, uncapped and diluted with diethyl ether. After stirring in the air to oxidize all the copper, the blue heterogeneous mixture is filtered through neutral alumina and concentrated under reduced pressure. The residue is dissolved in hexanes and purified by column chromatography on silica gel in 25% diethyl ether in hexanes to remove the remaining monomer and then increasing to 75% diethyl ether elutes the polymer.

This material is then hydrolyzed to form a branched polyacrylic acid.

Example 2—Synthesis of the Branched Polymer

General Procedures for Preparation of Branched PAA

Synthesis of Linear Oligo(tert-butyl Acrylate) (OTBA)

In the scheme above, each dot represents a single TBA repeat unit. Thus pentamers, hexamers, an octamer, and a tetramer are depicted. Oligomerization was carried out by the syringe technique under dry argon in baked glass tubes equipped with a three-way stopcock or in sealed glass vials. A representative polymerization procedure for tert-butyl acrylate (TBA) using tert-butyl 2-bromoisobutyrate (t-BBiB) is provided. CuBr (100 mg, 0.697 mmol), TBA (6.07 mL, 41.8 mmol), acetone (1.46 mL), t-BBiB (0.52 mL, 2.79 mmol), and N,N,N',N",N"-pentamethyldiethylenetri-amine (PMDETA, 0.15 mL, 0.697 mmol) were sequentially added to a round-bottom flask (50 mL) filled with argon. Immediately after mixing, aliquots (0.50-1.0 mL each) of the solution were injected into baked glass tubes, which were then sealed (except when a stopcock was used) and placed in an oil bath kept at 40° C. At selected time intervals, samples of the polymerization mixture were terminated by cooling to −78° C. with dry ice-methanol. Monomer conversion was determined from residual monomer concentration measured by 1H NMR. The quenched solutions were evaporated and dissolved in THF, and the catalyst residue was removed by passing the THF solutions through silica gel. The solutions were evaporated to dryness, and further dried overnight under vacuum at room temperature. Since these were relatively low molecular weight species molecular weight and branching was determined by nuclear magnetic resonance (NMR) spectroscopy. Results from a representative oligomerization procedure for TBA using t-BBiB is provided are Table 1.

TABLE 1

Structural Characterization of OTBAa

| Entry | Target degree of polymerization | Reaction Time (hr) | Degree of polymerization, by NMR | Mn (g/mol) | Mw/Mn |
|---|---|---|---|---|---|
| 1 | 4 | 1.0 | 3.9 | 770 | 1.21 |
| 2 | 8 | 3.0 | 8.3 | 1150 | 1.23 |
| 3 | 15 | 4.0 | 17.1 | 1810 | 1.25 | a) [t-BA]0 = 5.2M; [t-BBiB]0 = 0.35M; [CuB1]0 = 87mM; [PMDETA]0 = 87mM in acetone at 40° C..

Separation of Oligo(tert-butyl acrylate) (OTAB)

A BIOTAGE™ SP1 flash purification system was equipped with an appropriate column cartridge (KP SIL-340 g). The column was equilibrated with 4 column volumes of hexane. Crude OTBAs (7.0 g) were dissolved in 20.0 mL of hexane and loaded onto the column, followed by a 10 mL of hexane washes to complete the loading. The OTBA was eluted with hexane/ethyl acetate (EtOAc) mixtures, following a programmed gradient. The flow rate was set as 80 mL/min. The target OTBA (DPn=3, 5, 7, and 14) were successfully separated and analyzed by MALDI-TOF for DP. The DP results were consistent with DP obtained by 1H NMR. Fractions of like DP were combined. The discrete OTBAs were evaporated overnight in vacuo at room temperature.

Synthesis of Oligo(tert-Butyl Acrylate) Oligomonomers

The oligomonomers were prepared from well-separated OTBAs with $n_a$ of 3, 5, 7, and 14 by substitution of bromine at the OTBA chain-end with acrylic acid in the presence of 1,8-diazabicyclo[5.4.0]undec-7-ene (DBU). In a representative procedure, a mixture of OTBA (tetradecamer, 6.00 g, 2.98 mmol, 1.0 eq), ethyl acetate (10.0 mL), and DBU (0.89 mL, 5.96 mmol, 2.0 eq) were placed in 100 mL round-bottom flask. Acrylic acid (0.41 mL, 5.96 mmol, 2.0 eq) was slowly added. The solution was then stirred for 48 h at room temperature. The solution was diluted with EtOAc and washed with NaHCO3 saturated solution (3×100 mL). The organic layer was dried over anhydrous MgSO4 for several hours, and the filtered solution was evaporated. The crude product was purified by silica gel column chromatography (EtOAc/hexane). The eluate was evaporated to dryness, and further dried overnight under vacuum at room temperature, providing 5.70 g of oligomonomer (95.1% yield).

General Atom-Transfer Radical-Copolymerization (ATRP) and Deprotection Procedure Copolymerization was carried out by the syringe technique under dry argon in baked glass tubes equipped with a three-way stopcock or in sealed glass vials. A representative procedure for copolymerization of TBA with oligomonomer/t-BBiB/Ru(Ind)/n-Bu3N is provided. Copolymerization conditions for Examples 1-4 are provided in the footnotes to Table 3 below. In a round-bottom flask (50 mL) filled with Ar was placed Ru(Ind) (15.5 mg, 0.02 mmol). Toluene (0.38 mL), oligomonomer (not precise, 15.4-mer, 0.346 g, 0.16 mmol), tetraline (0.01 mL), TBA (0.11 mL, 0.76 mmol), n-Bu3N solution (0.50 mL, 400 mM, 0.20 mmol), and t-BBiB (7.50 μL, 0.04 mmol) were sequentially added, providing a total volume of 1.0 mL. Immediately after mixing, aliquots (0.20-0.30 mL each) of the solution were injected into baked glass tubes, which were then sealed (except when a stopcock was used) and placed in an oil bath kept at 80° C. At selected intervals, samples of the polymerization mixture were terminated by cooling to −78° C. in dry ice-methanol. Monomer conversion was determined from residual monomer concentration measured by 1H NMR with tetraline as internal standard. The quenched solutions were evaporated to dryness and further dried overnight under vacuum at room temperature. The copolymer (1 g) was dissolved in neat TFA (10 mL) and stirred overnight at room temperature. TFA was removed under reduced pressure. The crude product was dissolved in THF and precipitated in hexane to give the products as white solids in quantitative yield (>99%).

Example 3—Inhibition of BaSO4 Scale

The test inhibitors are compared regarding their ability to prevent scale formation and adherence at the following application conditions: coil length of 1 m, coil internal diameter (ID) of 0.75 mm. Preferred concentration of scale inhibitors were prepared with anionic fraction of the solution and injected separately from cation and anion solution at the desired flow rate. Scale inhibitor concentration was decreased stepwise (starting from blank) until the differential pressure reached 5. The lowest concentration at which no blockage took place was considered as minimum inhibitor concentration (MIC).

The Standard Forties field condition, which has a severe barite (barium sulfate) scaling tendency was used here to evaluate the performance of scale inhibitors. Table 2 shows the concentration of different ions in a 50:50 mix of the formation water (Forties) and seawater.

TABLE 2

| Ion concentrations in Forties Field Conditions | |
|---|---|
| Ion | ppm |
| Na | 20130 |
| K | 416 |
| Mg | 936 |
| Ca | 1618.5 |
| Sr | 287 |
| Ba | 126 |
| HCO3 | 310 |
| SO4 | 1480 |

Figure 1:
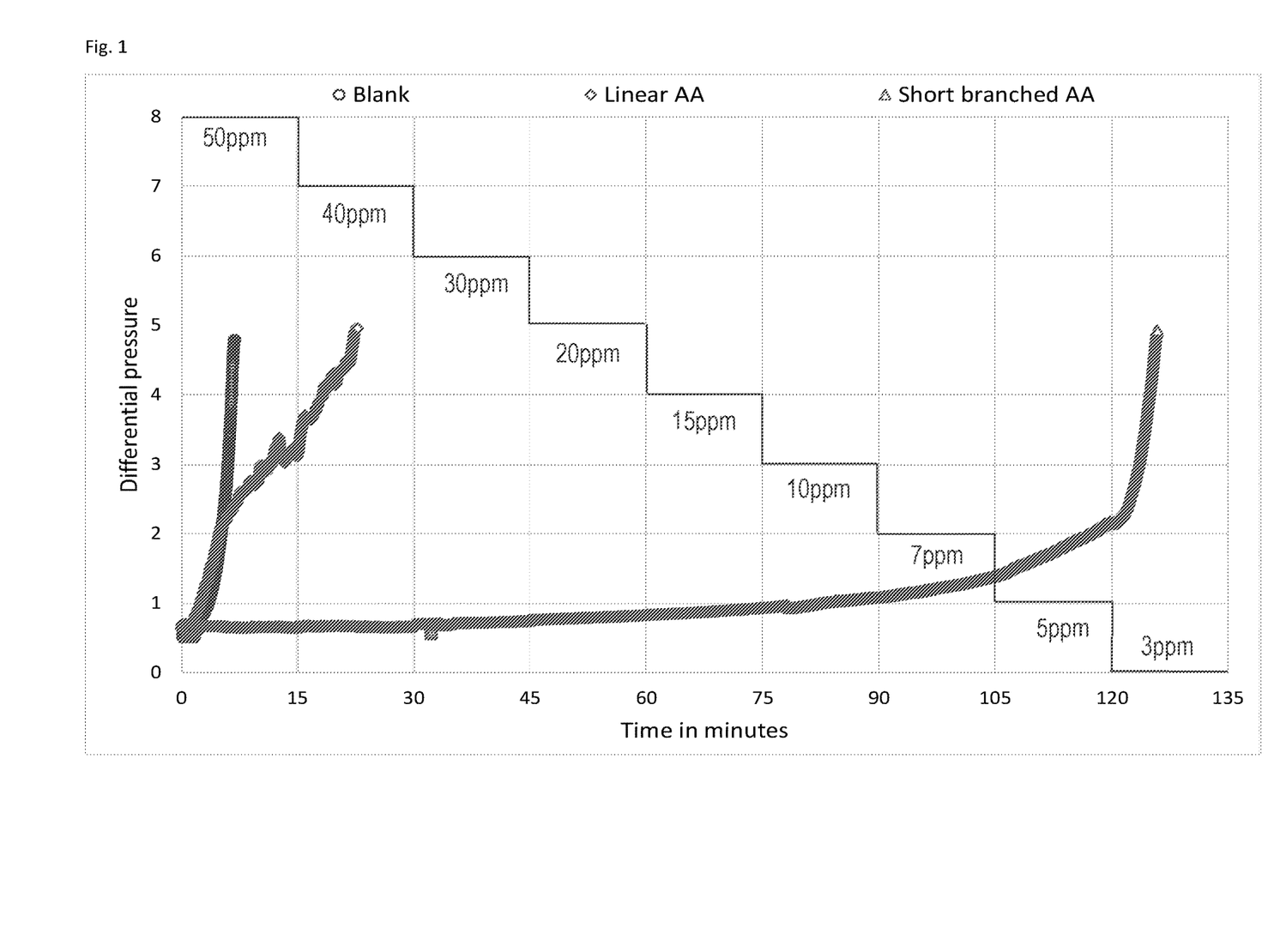
FIG. 1 shows the differential pressure versus time for dynamic scale loop tests of Example 3.

A series of dynamic scale loop tests have been conducted at 100° C. and 250 psi to assess the performance in preventing scale precipitation of scale inhibitors selected from coded linear AA which is Acusol™ 441 linear polyacrylic acid from The Dow Chemical Company 1 and branched AA synthesized as discussed in Example 1 and having an average overall degree of polymerization of about 30, an average branch degree of polymerization of 2, a backbone average degree of polymerization of 12 and having an average number of branches of 9. The linear AA has a molecular weight of 3500 g/mol. The results are shown in FIG. 1. A blank was run with the untreated fluid and it was shown to have an average blank time to a differential pressure of 5 was determined to be approximately 7.5 min and so the scale inhibitor must resist scale deposition (determined to be a rise in differential pressure of 5 psi) for a period of 15 min (2 times the blank scale-up time) according to evaluation criteria. The performance linear AA polymer as a scale inhibitor compared to the blank is also shown. The initial concentration of the scale inhibitor is 50 ppm and every 15 minutes the concentration of the polymer decreased to the next lowest scale inhibitor concentration until differential pressure reaches 5 psi. As can be seen, the differential pressure reached 5 psi at around 23 minutes of run time translates to 40 ppm of scale inhibitor. The minimum scale inhibitor concentration (MIC) of the linear AA needed to prevent the formation of scale is 50 ppm. In contrast, the branched AA polymer as a scale inhibitor was compared linear AA. The initial concentration of the scale inhibitor is 50 ppm and every 15 minutes the concentration of the polymer decreased to the next lowest scale inhibitor concentration until differential pressure reaches 5 psi. As can be seen in FIG. 1 the differential pressure reached 5 psi at around 125 minutes of run time translates to 3 ppm of scale inhibitor. The minimum scale inhibitor concentration (MIC) of the branched AA needed to prevent the formation of scale is 5 ppm. The MIC of the of the scale inhibitor decreased by 10 times by changing the architecture of the acrylic acid from linear to short branched.

Example 4—Inhibition of Calcium Carbonate Scale

The test as in Example 3 was repeated but using The Standard Shearwater formation water, which has a severe calcium carbonate scaling tendency was used here to evaluate the performance of scale inhibitors. Table 3 shows the concentration of different ions in the Shearwater formation water.

TABLE 3

| Ion concentrations in Shearwater Field Conditions | |
|---|---|
| Ion | ppm |
| Na | 68000 |
| K | 4960 |
| Mg | 680 |
| Ca | 18960 |
| Sr | 1625 |
| Ba | 2340 |
| HCO3 | 560 |
| SO4 | 0 |

Figure 2:
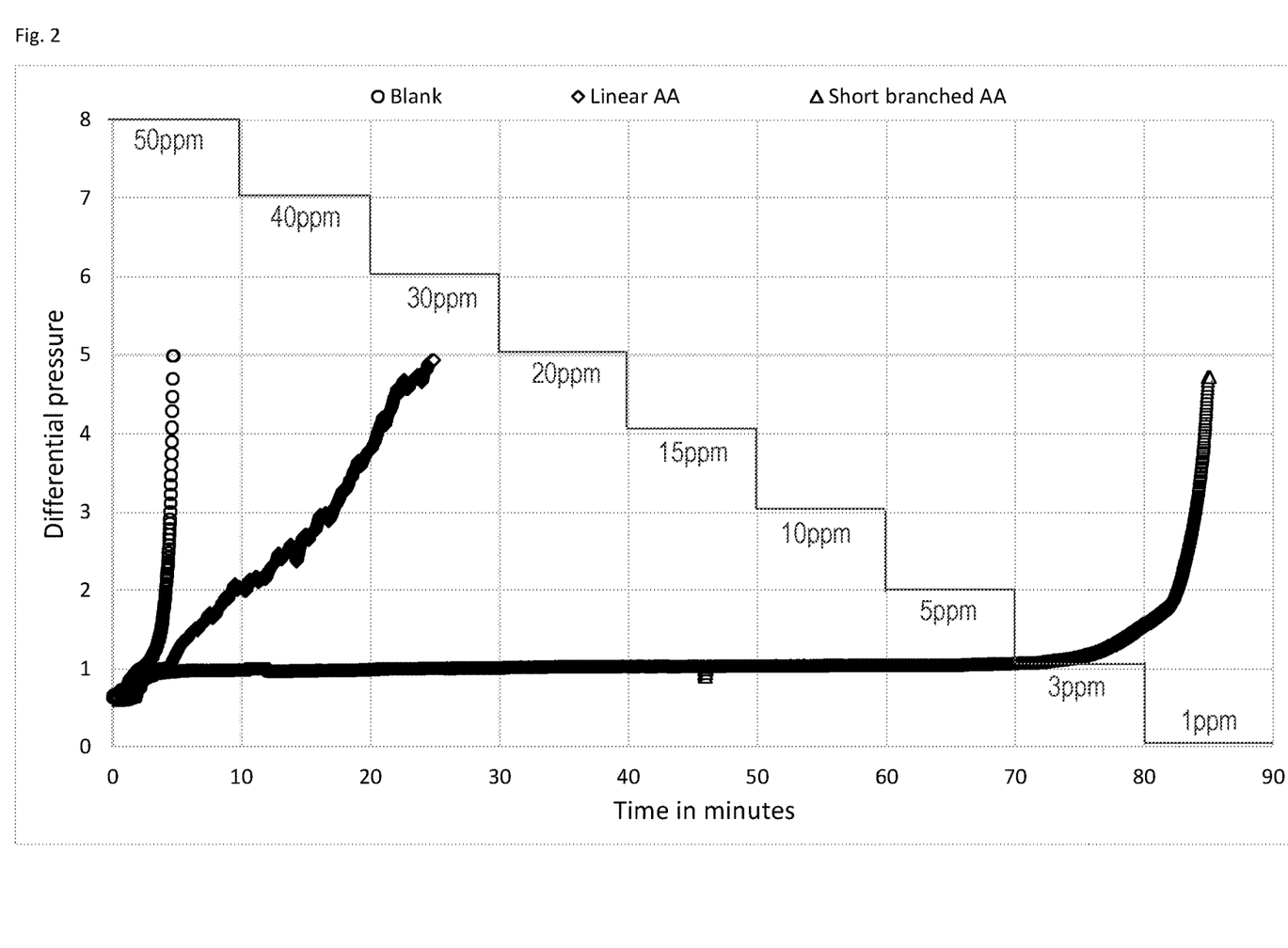
FIG. 2 shows the differential pressure versus time for dynamic scale loop tests of Example 4.

As shown in FIG. 2, differential pressure versus time plot for blank test (without scale inhibitor) shows that, the average blank time was determined to be approximately 5 minutes and so the scale inhibitor must resist scale deposition (determined to be a rise in differential pressure of 5 psi) for a period of 10 minutes (2 times the blank scale-up time) according to evaluation criteria. Using the linear AA polymer as a calcium carbonate scale inhibitor compared to the blank. The initial concentration of the scale inhibitor is 50 ppm and every 10 minutes the concentration of the polymer decreased to the next lowest scale inhibitor concentration until differential pressure reaches 5 psi. As can be seen in FIG. 2 the differential pressure reached 5 psi at around 25 minutes of run time translates to 30 ppm of scale inhibitor. The minimum scale inhibitor concentration (MIC) of the linear AA needed to prevent the formation of calcium carbonate scale in shearwater formation water is 40 ppm. In contrast, using the branched AA polymer as a scale inhibitor was compared linear AA. The initial concentration of the scale inhibitor is 50 ppm and every 10 minutes the concentration of the polymer decreased to the next lowest scale inhibitor concentration until differential pressure reaches 5 psi. As can be seen in FIG. 2 the differential pressure reached 5 psi at around 85 minutes of run time translates to 1 ppm of scale inhibitor. The minimum scale inhibitor concentration (MIC) of the branched AA needed to prevent the formation of scale is 3 ppm. The MIC of the of the scale inhibitor decreased by 12 times to prevent the calcium carbonate scales by changing the architecture of the acrylic acid from linear to short branched.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent"). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Aryl" means an aromatic hydrocarbon group containing the specified number of carbon atoms, such as phenyl, tropone, indanyl, or naphthyl. "The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

What is claimed is:

1. A method of inhibiting scale formation comprising adding, to a fluid comprising one or more ions selected from sodium, potassium, magnesium, calcium, strontium, barium, carbonate, sulfate, and bicarbonate, an antiscale agent comprising a polycarboxylic acid, a salt thereof, a combination of the acid or the salt and an ester thereof, or a combination of the salt, the acid and the ester characterized by having a polymer backbone and a plurality of branches from the polymer backbone wherein a portion of the —COO— groups of the polycarboxylic acid and/or salt thereof are unhydrolyzed and have a structure —COORa wherein Ra is a hydrocarbyl group of 1 to 8 carbon atoms.

2. The method of claim 1 wherein the plurality of branches are two or more branches.

3. The method of claim 1 wherein the average degree of polymerization of the branches is from 2 to 20.

4. The method of claim 1 wherein there are five or more branches.

5. The method of claim 1 wherein there are no more than 20 branches.

6. The method of claim 1 wherein the polymer backbone has a degree of polymerization of 6 to 100.

7. The method of claim 1 wherein the number average molecular weight of the polycarboxylic acid is from 700 to 50,000 g/mol.

8. The method of claim 1 wherein the polycarboxylic acid is formed from monomers selected from acrylic acid, methacrylic acid, butenoic acid, crotonic acid, itaconic acid, an itaconic acid monoester, fumaric acid, a fumaric acid monoester, maleic acid, a maleic acid monoester, or a combination thereof.

9. The method of claim 1 wherein the fluid comprises barium and sulfate ions.

10. The method of claim 1 wherein the fluid comprises calcium and carbonate and/or bicarbonate ions.

11. The method of claim 1 wherein the antiscale agent is added to the fluid in an amount of 1 to 100 ppm based on total weight of the fluid.

12. The method of claim 11 wherein the amount of antiscale agent is 3 to 20 ppm.

13. The method of claim 1 wherein the plurality of branches are five to twenty.

14. The method of claim 13 wherein the degree of polymerization of the backbone is 6 to 100.

15. The method of claim 14 wherein the average degree of polymerization of the branches is from 2 to 20.

16. The method of claim 15 wherein the antiscale agent is added in an amount of 3 to 20 ppm based on total weight of the fluid.

* * * * *